US006662932B1

United States Patent
O'Neill

(10) Patent No.: US 6,662,932 B1
(45) Date of Patent: Dec. 16, 2003

(54) CHAIN AND FLIGHT CONVEYOR WITH SWIVEL LINKS

(75) Inventor: Michael L. O'Neill, Lucinda, PA (US)

(73) Assignee: Joy MM Delaware, Inc.

(*) Notice: Subject to any disclaimer, the term of this patent is extended or adjusted under 35 U.S.C. 154(b) by 32 days.

(21) Appl. No.: 10/336,928

(22) Filed: Jan. 6, 2003

(51) Int. Cl.⁷ .............................................. B65G 19/24
(52) U.S. Cl. ........................ 198/730; 198/728; 198/729
(58) Field of Search ................................ 198/728, 729, 198/730, 731, 732, 733

(56) References Cited

U.S. PATENT DOCUMENTS

| | | | |
|---|---|---|---|
| 2,613,546 A | | 10/1952 | Jorgensen |
| 2,674,365 A | * | 4/1954 | Russell .................. 198/730 |
| 2,922,511 A | * | 1/1960 | Ruppe .................... 198/730 |
| 3,584,734 A | * | 6/1971 | Richards et al. ............. 198/732 |
| 3,762,535 A | * | 10/1973 | Becker et al. ............... 198/729 |
| 4,339,031 A | | 7/1982 | Densmore |
| 4,667,813 A | | 5/1987 | Densmore |
| 5,088,594 A | | 2/1992 | Edmondson |

* cited by examiner

Primary Examiner—James R. Bidwell
(74) Attorney, Agent, or Firm—James Earl Lowe, Jr.

(57) ABSTRACT

A chain driven by two sprockets spaced a short distance apart along their common axial centerline. The chain includes elongated pins that extend beyond the outer surfaces of the chain link plates, on both sides, by a distance about equal to the width of the spaced apart sprockets. The chain is aligned midway between the sprockets, and the sprocket teeth drive on the extended portion of the chain pins. Where a flight is attached to the chain links, the pins are extended still further, to fit into the indentations or holes in the flights. This provides an exposed length of each pin in alignment with the sprocket on each side for driving purposes.

2 Claims, 2 Drawing Sheets

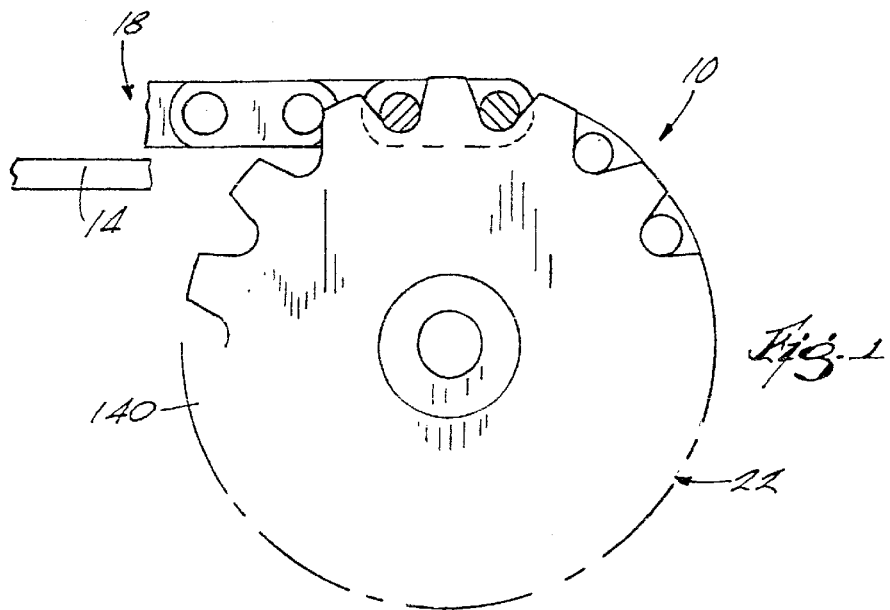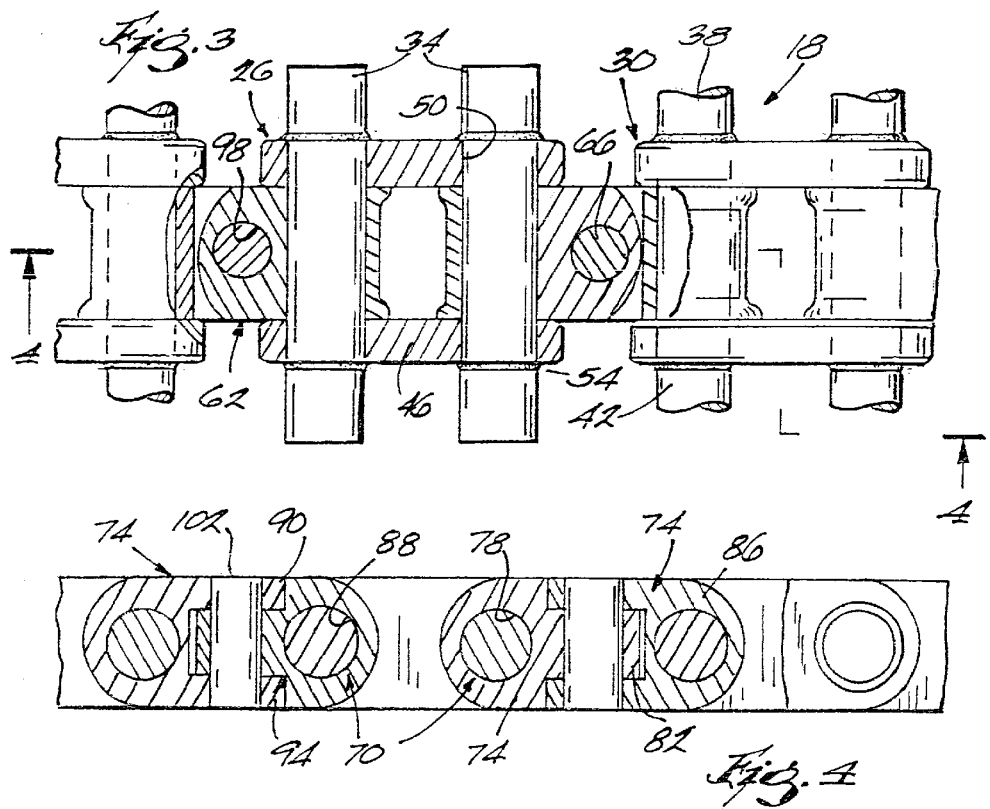

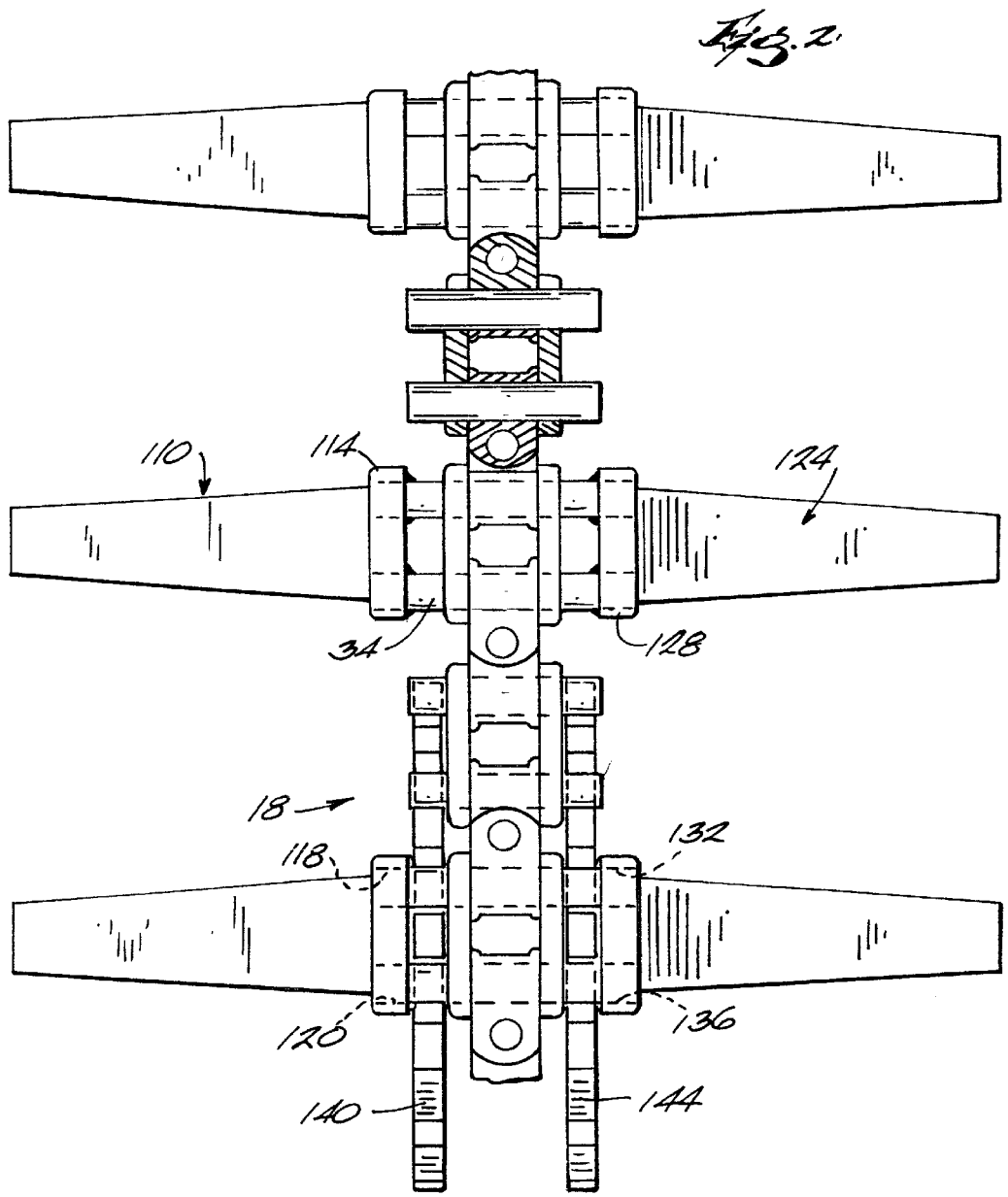

CHAIN AND FLIGHT CONVEYOR WITH SWIVEL LINKS

BACKGROUND OF THE INVENTION

The present invention relates to a chain and flight conveyor for use in conveying materials in the mining industry, and, in particular, to an improved design of a chain and flight conveyor having an improved drive sprocket assembly. Still more particularly, this invention relates to conveyor chains for continuous miners and chain haulage units.

Conveyor chains for use on continuous miners and chain haulage units must have the ability to flex sideways to allow them to make turns. For this purpose, they include swivel links. Unlike a link from a standard roller or stud-brushed chain, a swivel link cannot be sprocket-driven on its interior, because the space within it is mostly filled with the swivel pin and the lugs that surround the swivel pin. A swivel link can only be sprocket driven on its outer ends.

The chains are driven by a single sprocket aligned with the center of the chain as viewed from above. As the swivel link can only be driven on its ends, not its interior, this means that the sprocket can only drive every other pitch, reducing the number of teeth on the sprocket by half. The result is faster sprocket wear, and rougher and noisier chain/sprocket interaction. It is also more likely that the chain will come off of the sprocket in certain conditions.

SUMMARY OF THE INVENTION

One of the principal objects of this invention is provide an improved conveyor chain and flight assembly that permits driving of every link in a swivel chain.

This invention provides a conveyor including a pan, and a conveyor chain and flight assembly that travels over the pan. The conveyor chain and flight assembly includes a first link assembly and a second link assembly, each of which includes two spaced apart drive pins, each of which has a first end and a second end, and two spaced apart side plates, each of which has two spaced apart openings, each opening receiving a different one of the drive pins. The conveyor chain and flight assembly further includes drive pin retaining means for retaining the drive pins in the side plates, and a swivel assembly connecting the two link assemblies, the swivel assembly including a swivel pin, a male connecting lug, and a female connecting lug. The male connecting lug has a base having a horizontal bore that receives one of the drive pins of the first link assembly, and a tongue connected to the base, and the female connecting lug has a base having a horizontal bore that receives one of the drive pins of the second link assembly, and a spaced apart upper lip and lower lip connected to the base. The male connecting lug tongue extends between the spaced apart lips, and each of the lips and the tongue have openings therein that form a bore through the male and female lugs that receives the swivel pin. The swivel link further includes swivel pin retaining means for retaining the swivel pin in the lugs. The conveyor chain and flight assembly further includes a first flight connected to one of the first and the second link assemblies, the flight having a flight head having two spaced apart indentations, each of which receives a different one of the first ends of the drive pins, and first flight securing means retaining the drive pin first ends in the first flight head so that the first flight head is spaced from its respective side plate. The conveyor chain and flight assembly further includes a second flight connected to the one of the first and the second link assemblies, the flight having a flight head having two spaced apart indentations, each of which receives a different one of the second ends of the drive pins, and second flight securing means retaining the drive pin second ends in the second flight head so that the second flight head is spaced from its respective side plate. The conveyor chain and flight assembly further includes a sprocket drive including two spaced apart drive sprockets, with each drive sprocket engaging the drive pins between the side plates and the side plate's respective flight.

BRIEF DESCRIPTION OF THE DRAWINGS

FIG. 1 is a side view with a partial cutaway of a continuous miner conveyor chain with flights and showing the drive sprocket engaging the chain;

FIG. 2 is a plain view of the improved chain and flight conveyor of this invention being driven by the improved drive sprocket of this invention. A portion of one link assembly is broken away.

FIG. 3 is an enlarged view of the partially broken away section of the chain shown in FIG. 2.

FIG. 4 is a partial cross-sectional view taken along the line 4—4 in FIG. 3.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DETAILED DESCRIPTION OF THE PREFERRED EMBODIMENT

This invention provides, as illustrated in the drawings, a conveyor 10 including a pan or conveying deck 14 of, for example, a continuous miner or a shuttle car, and a conveyor chain and flight assembly 18 that travels over the pan 14. The conveyor 10 also includes a sprocket drive 22.

More particularly, as shown in FIGS. 3 and 4, the conveyor chain and flight assembly 18 includes a first link assembly 26 and a second link assembly 30, each of which includes two spaced apart drive pins 34, each of which has a first end 38 and a second end 42. Still more particularly, the chain and flight assembly 18 is formed from a plurality of alternating first link assemblies 26 and second link assemblies 30. Each link assembly also includes two spaced apart side plates 46, each of which has two spaced apart openings 50, each opening 50 receiving a different one of the drive pins 34. Drive pin retaining means in the form of welding retains the drive pins 34 in the side plates 46. The conveyor chain and flight assembly 18 also includes a swivel assembly 62 connecting the two link assemblies 26 and 30, the swivel assembly 62 including a swivel pin 66, a male connecting lug 70, and a female connecting lug 74.

More particularly, the male connecting lug 70 has at base 75 with a horizontal bore 78 that receives one of the drive pins of the first link assembly 26, and a tongue 82 connected to the base 75. The female connecting lug 74 has a base 86 with a horizontal bore 88 that receives one of the drive pins of the second link assembly 30, and a spaced apart upper lip 90 and lower lip 94 connected to the base 86. The male connecting lug tongue 82 extends between the spaced apart lips 90 and 94, each of the lips and the tongue having openings therein that form a bore 98 through the male and female lugs that receives the swivel pin 66. Swivel pin retaining means in the form of a weld retains the swivel pin 66 in the lugs 70 and 74.

The conveyor chain and flight assembly 18 also includes a first flight 110 (see FIG. 2) connected to one of the first and the second link assemblies, the flight 110 having a flight head 114 having two spaced apart indentations 118 and 120, each of which receives a different one of the first ends of the drive pins 34. The conveyor chain and flight assembly 18 also includes first flight securing means retaining the drive pin first ends in the first flight head so that the first flight head is spaced from its respective side plate. More particularly, the drive pin first ends are press-fitted or welded to the first flight head 114. Still more particularly, a pair of such first and second flights is connected to each of the second link assemblies. In other embodiments (not shown), the pair of such first and second flights can be connected to the first link assemblies.

The conveyor chain and flight assembly 18 also includes a second flight 124 connected to the one of the first and the second link assemblies, the flight 124 having a flight head 128 having two spaced apart indentations 132 and 136, each of which receives a different one of the second ends of the drive pins 34. The conveyor chain and flight assembly 18 also includes second flight securing means retaining the drive pin second ends in the second flight head 128 so that the second flight head is spaced from its respective side plate. More particularly, the drive pin second ends are press-fitted or welded to the second flight head 128.

As illustrated in FIGS. 1 and 2, the conveyor. chain and flight assembly sprocket drive 22 includes two spaced apart drive sprockets 140 and 144, with each of the drive sprockets engaging the drive pins 34 between the side plates and the side plate's respective flight.

In summary then, the invention is a chain 10 driven by two sprockets 140 and 144 spaced a short distance apart along their common axial centerline (see FIG. 2). The chain 10 includes elongated pins 34 that extend beyond the outer surfaces of the chain link plates 46, on both sides, by a distance about equal to the width of the spaced apart sprockets 140 and 144. The chain is aligned midway between the sprockets 140 and 144, and the sprocket teeth drive on the extended portion of the chain pins 34. Where a flight is attached to the chain links, the pins are extended still further, to fit into the indentations or holes in the flights. This provides an exposed length of each pin in alignment with the sprocket on each side for driving purposes.

The sprockets 140 and 144 are located away from the center of the chain and therefore away from any interference with the swivel link. The sprockets can thus drive the chain on every pitch.

Various other features and advantages of the invention will be apparent from the following claims.

What is claimed is:

1. A conveyor including
   a pan,
   a conveyor chain and flight assembly that travels over said pan, said conveyor chain and flight assembly including
   a first link assembly and a second link assembly, each of which includes
      two spaced apart drive pins, each of which has a first end and a second end,
      two spaced apart side plates, each of which has
      two spaced apart openings, each opening receiving a different one of said drive pins, and
      drive pin retaining means for retaining said drive pins in said side plates,
   a swivel assembly connecting said two link assemblies, said swivel assembly including a swivel pin,
   a male connecting lug having a base having a horizontal bore that receives one of said drive pins of said first link assembly, and a tongue connected to said base, and
   a female connecting lug having a base having a horizontal bore that receives one of said drive pins of said second link assembly, and
   a spaced apart upper lip and lower lip connected to said base, said male connecting lug tongue extending between said spaced apart lips, each of said lips and said tongue having openings therein that form a bore through the male and female lugs that receives said swivel pin, and
   swivel pin retaining means for retaining said swivel pin in said lugs, and
   a first flight connected to one of said first and said second link assemblies, said flight having a flight head having two spaced apart indentations, each of which receives a different one of said first ends of said drive pins, and
   first flight securing means retaining said drive pin first ends in said first flight head so that said first flight head is spaced from its respective side plate, and
   a second flight connected to said one of said first and said second link assemblies, said flight having a flight head having two spaced apart indentations, each of which receives a different one of said second ends of said drive pins, and
   second flight securing means retaining said drive pin second ends in said second flight head so that said second flight head is spaced from its respective side plate, and
   a sprocket drive including two spaced apart drive sprockets, with each drive sprocket engaging said drive pins between said side plates and the side plate's respective flight.

2. A chain and flight assembly adapted to travel over a pan, said conveyor chain and flight assembly including
   a first link assembly and a second link assembly, each of which includes
      two spaced apart drive pins, each of which has a first end and a second end,
      two spaced apart side plates, each of which has
      two spaced apart openings, each opening receiving a different one of said drive pins, and
      drive pin retaining means for retaining said drive pins in said side plates,
   a swivel assembly connecting said two link assemblies, said swivel assembly including a swivel pin,
   a male connecting lug having a base having a horizontal bore that receives one of said drive pins of said first link assembly, and a tongue connected to said base, and
   a female connecting lug having a base having a horizontal bore that receives one of said drive pins of said second link assembly, and a spaced apart upper lip and lower lip connected to said base, said male connecting lug tongue extending between said spaced apart lips, each of said lips and said tongue having openings therein that form a bore through the male and female lugs that receives said swivel pin, and swivel pin retaining means for retaining said swivel pin in said lugs, and a first flight connected to one of said first and said second link assemblies, said flight having a flight head having two spaced apart indentations, each of which receives a different one of said first ends of said drive pins, and first flight securing means retaining said drive pin first ends in said first flight head so that said first flight head is spaced from its respective side plate, and a second flight connected to said one of said first and said second link assemblies, said flight having a flight head having two spaced apart indentations, each of which receives a different one of said second ends of said drive pins, and second flight securing means retaining said drive pin second ends in said second flight head so that said second flight head is spaced from its respective side plate.

* * * * *